United States Patent
Otani et al.

(10) Patent No.: US 7,861,049 B2
(45) Date of Patent: Dec. 28, 2010

(54) METHODS AND APPARATUS FOR ARCHIVING DIGITAL DATA

(75) Inventors: Toshio Otani, Sunnyvale, CA (US); Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 11/942,663

(22) Filed: Nov. 19, 2007

(65) Prior Publication Data

US 2009/0132775 A1    May 21, 2009

(51) Int. Cl.
   *G06F 12/00* (2006.01)
(52) U.S. Cl. ........................................ 711/162
(58) Field of Classification Search ............... None
   See application file for complete search history.

(56) References Cited

U.S. PATENT DOCUMENTS

| | | | |
|---|---|---|---|
| 6,076,148 A * | 6/2000 | Kedem | 711/162 |
| 6,751,714 B2 * | 6/2004 | Milillo et al. | 711/162 |
| 6,823,349 B1 * | 11/2004 | Taylor et al. | 707/204 |
| 6,959,369 B1 * | 10/2005 | Ashton et al. | 711/162 |
| 7,096,342 B2 | 8/2006 | Chiu et al. | |
| 7,234,033 B2 * | 6/2007 | Watanabe | 711/162 |
| 7,237,079 B2 * | 6/2007 | Kaneda et al. | 711/162 |
| 7,266,655 B1 * | 9/2007 | Escabi et al. | 711/162 |
| 7,441,091 B2 * | 10/2008 | Sogabe | 711/162 |
| 7,546,324 B2 * | 6/2009 | Prahlad et al. | 707/204 |
| 7,549,028 B2 * | 6/2009 | Thompson et al. | 711/162 |
| 7,649,406 B2 * | 1/2010 | Parris et al. | 327/544 |
| 2005/0138081 A1 * | 6/2005 | Alshab et al. | 707/200 |
| 2005/0246398 A1 * | 11/2005 | Barzilai et al. | 707/204 |
| 2006/0200700 A1 * | 9/2006 | Malcolm | 714/38 |
| 2008/0140660 A1 * | 6/2008 | Masuda et al. | 707/6 |
| 2009/0089335 A1 * | 4/2009 | Shitomi et al. | 707/200 |

* cited by examiner

*Primary Examiner*—Hiep T Nguyen
(74) *Attorney, Agent, or Firm*—Sughrue Mion, PLLC

(57) ABSTRACT

Method and apparatus are disclosed to enable secure archiving and backup of data with reduced risk of data lost. Additionally, embodiments are provided which enable reduction of costs for CAS backup of archived files by use of low-cost tape storage devices rather than expensive hard drive devices.

4 Claims, 23 Drawing Sheets

| File System (Dir) | File | Device |
|---|---|---|
| /fs1 | A | 3001 |
| /fs1 | A | 3002 |
| /fs1 | B | 3001 |
| /fs1 | B | 3002 |
| /fs1 | C | 3001 |
| /fs1 | C | 3002 |
| ... | ... | ... |
| /fs2 | P | 3001 |
| /fs2 | P | 3002 |

| File System (Dir) | File | Device |
|---|---|---|
| /fs1 | A | 3001 |
| /fs1 | A | 7001 |
| /fs1 | B | 3001 |
| /fs1 | B | 7001 |
| /fs1 | C | 3001 |
| /fs1 | C | 7001 |
| ... | ... | ... |
| /fs2 | P | 3001 |
| /fs2 | P | 3002 |

METHODS AND APPARATUS FOR ARCHIVING DIGITAL DATA

BACKGROUND

1. Field of the Invention

This invention relates to method and apparatus for securely archiving data at lower costs.

2. Related Art

With the rapid increase in the amount of digital data, the amount of fixed digital contents is also growing rapidly. Generally, fixed digital data refers to digital data that does not undergo changes or editing, such as email, x-ray, voice archive, and so on. Much of these fixed contents are required to be retained for a long term, safely, and low cost. For example, fixed data may be required to be preserved for regulatory compliance, litigation, etc. Therefore, such data needs to be stored securely and at low cost, but readily available for future retrieval.

Recently, content addressed storage (CAS) systems have been developed for archiving fixed data. As noted above, archived data must be kept unchanged for a long term. Therefore, to guarantee data immutability, certain CAS systems use content address mechanism. Content address is a unique identifier of archived data, derived from the data content itself. CAS calculates hash value of the archived data by using hash algorithm such as MD5, SHA1 or SHA 256. Other features of CAS include, for example, write prohibition, retention period management, customer metadata addition, data integrity check, etc. In addition, CAS makes at least one replica of archived data and stores these data into distributed storage systems to protect archive data for a long term. For more information about CAS system and addressing, the reader is directed to U.S. Pat. No. 7,096,342.

The CAS system is required to provide high accessibility to archived data, low cost retention, and data protection functionality. However it is difficult to reduce the retention cost by current CAS solutions, because they use expensive and high performance storage system such as hard drive array (HDD) to provide high accessibility. In addition, current solutions cannot eliminate the risk of data loss, because they provide data protection features only within the CAS system itself, irrespective of the operation of the storage system, e.g., the network attached storage (NAS), or other CAS systems coupled to it. Therefore, solution that can solve these problems is strongly required.

SUMMARY

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Various aspects of the invention provide methods and apparatus, which eliminate the risk of losing archived data. Other aspects of the invention provide methods and apparatus, which reduce the retention cost of archived data. Aspects of the invention are applicable to various storage systems, e.g., networked storage system such as, for example, Network Attached Storage (NAS), Content Addressable Storage (CAS), etc.

According to one feature of the invention, the operation of archiving and replicating is performed in a manner that prevents potential loss of data. In its broad view, according to this feature when a file is being archived from a storage system, e.g., a network attached storage (NAS) to CAS, the conventional methodology of deleting the file from the NAS after the file has been copied to CAS is modified. When the file is copied into the CAS, a write protection is enabled on the file in the NAS, but the file is not deleted. Then, when the archived file in the CAS is duplicated in the replicating storage system, then the write protection is removed and the original file is deleted from the NAS. This process ensures that the file is not lost in case the archiving server goes down before the archived files are replicated.

According to another feature, management of data storage, archiving and retention in two connected sites is provided. In its broad view, according to this feature the conventional process of transmitting an archived file from CAS in site A to CAS in site B is eliminated. Eliminating this transmission solves at least two important issues. First, any transmission from one site to another poses a risk of interception or man-in-the-middle attach by third parties. Avoiding this transmission eliminates this risk so that the security of the data is increased. Second, transmission of archived data from one site to another requires transmission line bandwidth which, depending on the amount of archived data, may be large and expensive. Avoiding this transmission eliminates this requirement for transmission bandwidth.

According to yet another feature of the invention, the overall costs of archived and backup data retention is reduced. Due to the feature-reach environment of conventional CAS system, such systems conventionally utilize hard drive arrays as the storage medium. This enables the various features of the CAS system, including the easy and rapid accessibility to archived files. However, hard drive arrays are relatively expensive, as compared to, for example, tape storage media. According to features of the invention, methodologies are provided to enable utilizing tape storage media in a CAS environment, while retaining the feature-reach environment of the CAS system. According to aspects of this inventive CAS system, an archived file is stored on a hard drive array, in the conventional manner. However, a replica or backup copy is stored on a tape drive. A mapping table is maintained to identify the location of each archived file stored in the hard drive array and the location on the tape storage of the corresponding replica file. If a request is received to access the file, the file is fetched from the hard drive, so as to provide rapid access to the file. If the file cannot be found in the hard drive, due, for example, to hard drive failure or data corruption on the hard drive, then the mapping table is interrogated to find the location of the corresponding replica file. The replica file is then copied onto the hard drive array to restore the archived file. Then the restored archived file is provided to the requesting host.

According to aspects of the invention, a method for managing a backup of files stored on a storage system and archived on a content addressable storage (CAS) system and duplicated on a backup storage system is provided, the method comprising: for each archiving operation performing the operations: copying the files for archiving from the storage system onto the CAS to generate archived files; maintaining a write protect in the storage system until a backup operation in the CAS system has been performed, thereby preventing any modifications of the files; and, once a backup operation has been performed in the CAS system so as to generate duplicate files, deleting the files from the storage system. The storage system may comprise a network attached storage (NAS) and the method may further comprise storing a stub in the NAS indicating the storage location in the CAS of the archived files. The method may further compre, upon receiving a read request for one of the files, determining whether a corresponding archived file exists in the CAS archiving storage and, if so, fetching the corresponding archived file from the CAS system; otherwise, fetching a corresponding backup file from the backup system and storing a copy in the CAS to thereby generate a restored archived file, and thereafter providing the restored archived file. The method may further comprise moving the backup files to an offline storage system. Moving the backup files to an offline storage system may comprise copying the files onto a tape storage system. Moving the backup files to an offline storage system may comprise copying the files onto one of a virtual tape library or virtual disk library.

According to aspects of the invention, a method of managing file storage in first and second sites is provided, each site having a storage system and content addressable storage (CAS) system, the method comprising: synchronizing files in the storage system of the first site with storage system of the second site; when an archiving operation begins in the first site, performing the steps: enabling write protect on files on storage system in the first site; copying the files from the storage system in the first site onto the CAS system in the first site; monitoring archiving operation in the second site and, upon completion of archiving operation in the second site deleting the files from the storage system in the first site. The archiving operation in the second site may comprise copying files from the storage system of the second site to the CAS system of the second site. The storage system may comprise a network attached storage (NAS) and the method may further comprise storing a stub in the NAS system of the first site, indicating the storage location of the archived files in the CAS system of the first site. The method may further comprise upon receiving a read request from the storage system of the first site for one of the files, determining whether a corresponding archived file exists in the CAS storage of the first site and, if so, fetching the corresponding archived file from the CAS system of the first site; otherwise, fetching a corresponding backup file from the CAS system of the second site and storing a copy in the CAS system of the first site to thereby generate a restored archived file, and thereafter providing the restored archived file to the storage system of the first site.

According to aspects of the invention, a system for storage, archival and backup of files is provided, comprising: a network attached storage (NAS) system providing modifiable files to users; a content addressable storage (CAS) system for storing archival copies of the files; and a tape storage device coupled to the CAS system and storing backup copies of the archival copies. The system may further comprise a mapping table providing mapping of storage locations of archived files in the CAS system and corresponding backup copies in the tape storage device. The system may further comprise a plurality of logical units defined by the CAS system, and wherein each of the logical unit is assigned an attribute of primary or secondary, and wherein only files stored in logical units having secondary attribute are copied onto the tape storage. The CAS system may copy files for archival from the NAS system onto logical units having primary attributes, and then makes a duplicate from the logical units having primary attribute onto logical unit having secondary attribute. The system may further comprise a plurality of storage devices and a storage device attribute table, the storage device attribute table having entries for each of the storage devices, the entries comprising device ID, device size, primary/secondary attribute, and availability condition.

According to aspects of the invention, a method of managing storage, archival and backup of files is provided, comprising: providing a network attached storage (NAS) system that provides modifiable files to users; coupling to the NAS a content addressable storage (CAS) system and storing archival copies of the files in the NAS system; coupling to the CAS system a tape storage device and storing backup copies of the archival copies in the tape storage device. The method may further comprise: storing a stub having storage location address in the CAS for each archived file. The method may further comprise defining a plurality of logical units and assigning a primary or secondary attribute to each of the logical units, and backing up onto the tape storage only files stored in logical units having an assigned secondary attribute. The method may further comprise maintaining attribute table having entries for each of the logical units, the entries comprising device ID, device size, primary/secondary attribute, and availability condition. The method may further comprise maintaining a mapping table providing mapping of storage locations of archival files in the CAS system and corresponding backup copies in the tape storage device. Moving the backup files to an offline storage system may comprise copying the files onto an optical disk array.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIGS. 15(*a*) and 15(*b*) illustrate data mapping tables for data in primary and secondary online storage devices.

DETAILED DESCRIPTION

The following is a detailed description of several embodiments according to the invention. The embodiments enable secure archiving and backup of data with reduced risk of data loss. Additionally, embodiments are provided which enable reduction of costs for CAS backup of archived files by use of low-cost tape storage devices rather than expensive hard drive devices. The invention is applicable for operation with any storage system, e.g., networked storage system such as a network attached storage (NAS) or Direct Attached Storage (DAS), however, for clarity of description the embodiments are described with respect to NAS. However, it should be appreciated that the claims should not be limited to NAS, unless explicitly so stated.

Figure 1:
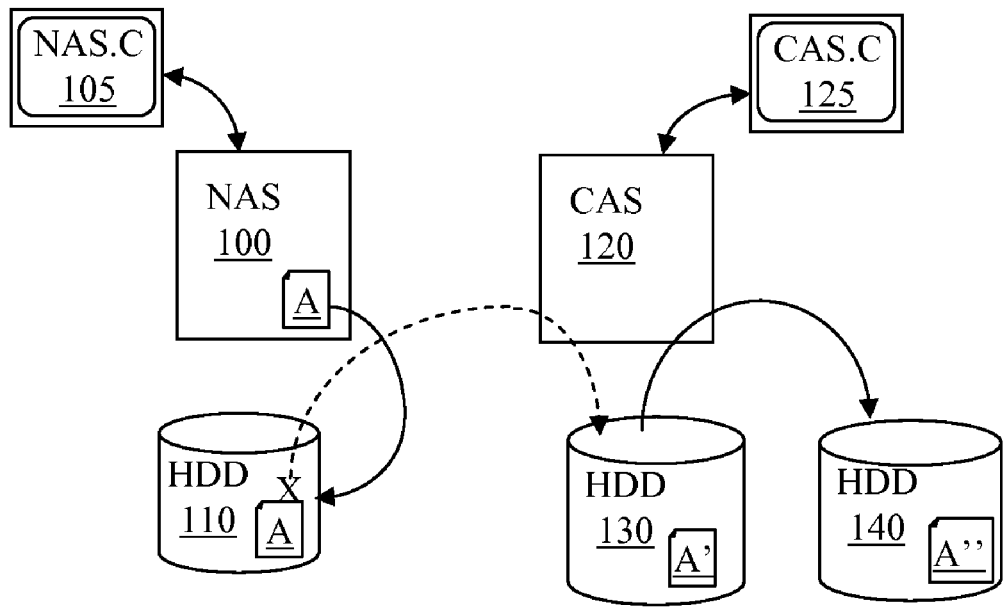
FIG. 1 schematically illustrates interaction of NAS and CAS systems according to the prior art.

FIG. 1 schematically illustrates interaction of NAS and CAS systems according to the prior art. NAS client 105 enables a user to operate on file A, residing within NAS storage system having NAS head 100 and storage device 110, such as, e.g., one or more hard drives, RAID array, etc. When time arrives to archive file A, the CAS server 120 would make a duplicate A', of file A, in its own storage device 130. Storage device 130 may also be hard drive, RAID array, etc. At this point file A is deleted from the NAS system, as shown by the arrow with an X—for delete—at its base. If the user wishes to fetch file A, it can be fetched from the CAS system 120 and presented to the user. Depending on the file management setup in the CAS system 120, the user may or may not be able to make any changes to file A'. Additionally, the CAS system has its own backup system and performs backup of archived files onto a backup storage device 140, which may also be a hard drive, RAID array, etc. FIG. 1 also illustrates the CAS client 125, which may be used to search files stored on the CAS system and for other functions, depending on the features enables in the CAS system.

The inventor of the subject invention identified a weakness in the above prior art system, in that since the CAS system performs its own backup operations independently of the operations of the NAS system, a situation may occur in which a file A is archived to the CAS system and conventionally deleted from the NAS system. However, before the CAS system performs its own backup operation, storage device 130 may fail, whereby file A' will be lost. Accordingly, the inventor has devised the following solution, which is described below with reference to FIG. 2.

Figure 2:
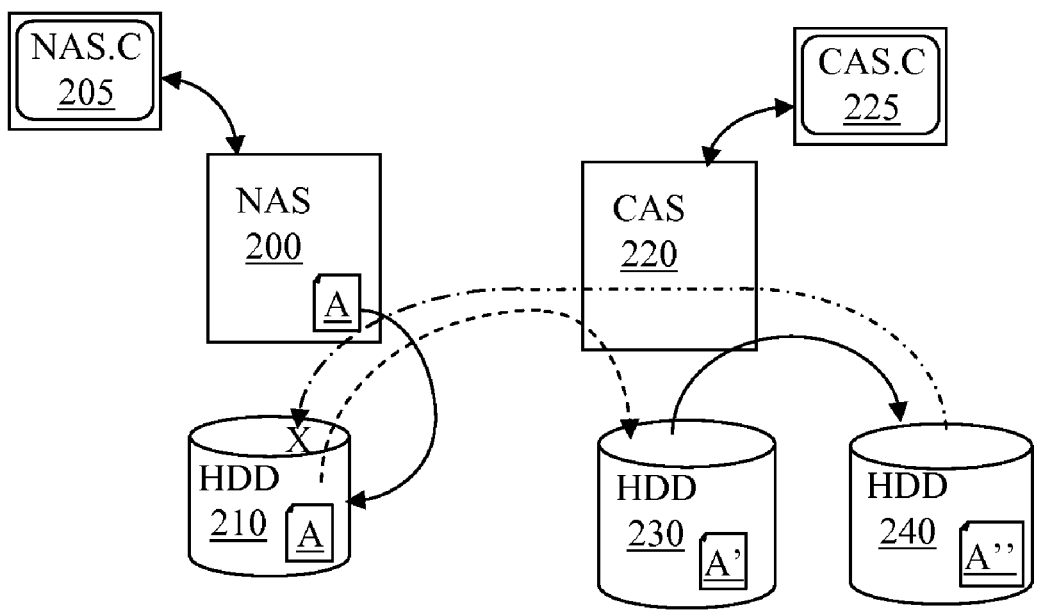
FIG. 2 schematically illustrates interaction of NAS and CAS systems according one embodiment of the invention.

As illustrated in FIG. 2, NAS client 205 enables the user to operate on file A, which is stored in storage device 210 coupled to NAS head 200. When an archiving operation is performed, a copy A' of file A is created in storage device 230. However, unlike the prior art system, file A is not deleted. Rather, file A is kept in storage device 210 until a backup operation is completed by CAS system and a backup or replica copy A" is stored in storage device 240. Optionally, write protect feature is enabled in the NAS system to prevent modification of the file after it has been archived. Once the archived file has been copied into the backup storage system, the original file A in NAS system is deleted, as illustrated by the return arrow with X—for delete—at its head.

Figure 3:
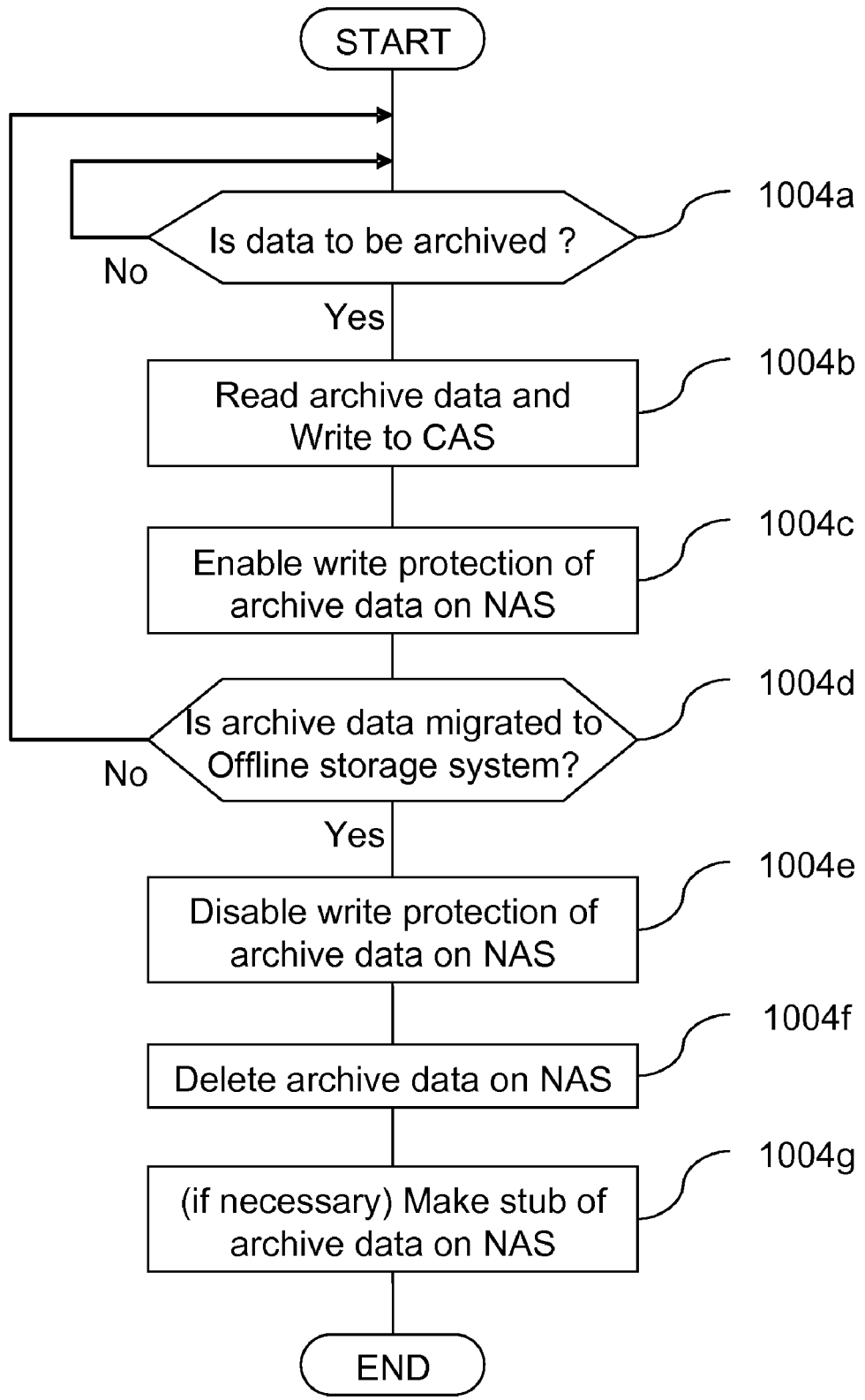
FIGS. 3, 4 and 5 illustrate a process of archive data protection between CAS system, storage system, e.g., Network Attached Storage (NAS) and offline (backup) storage system, according to an embodiment of the invention.
Figure 4:
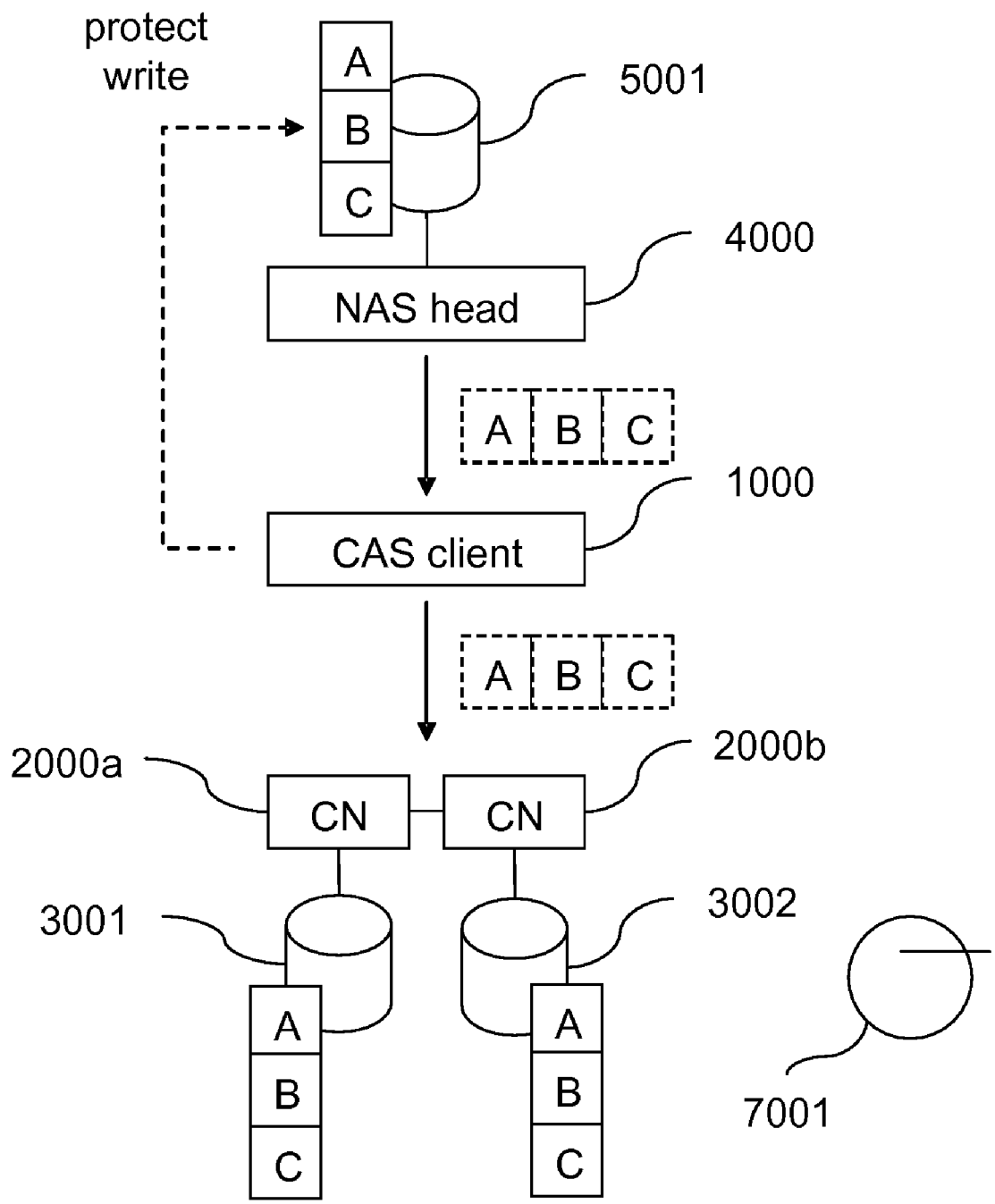
Figure 5:
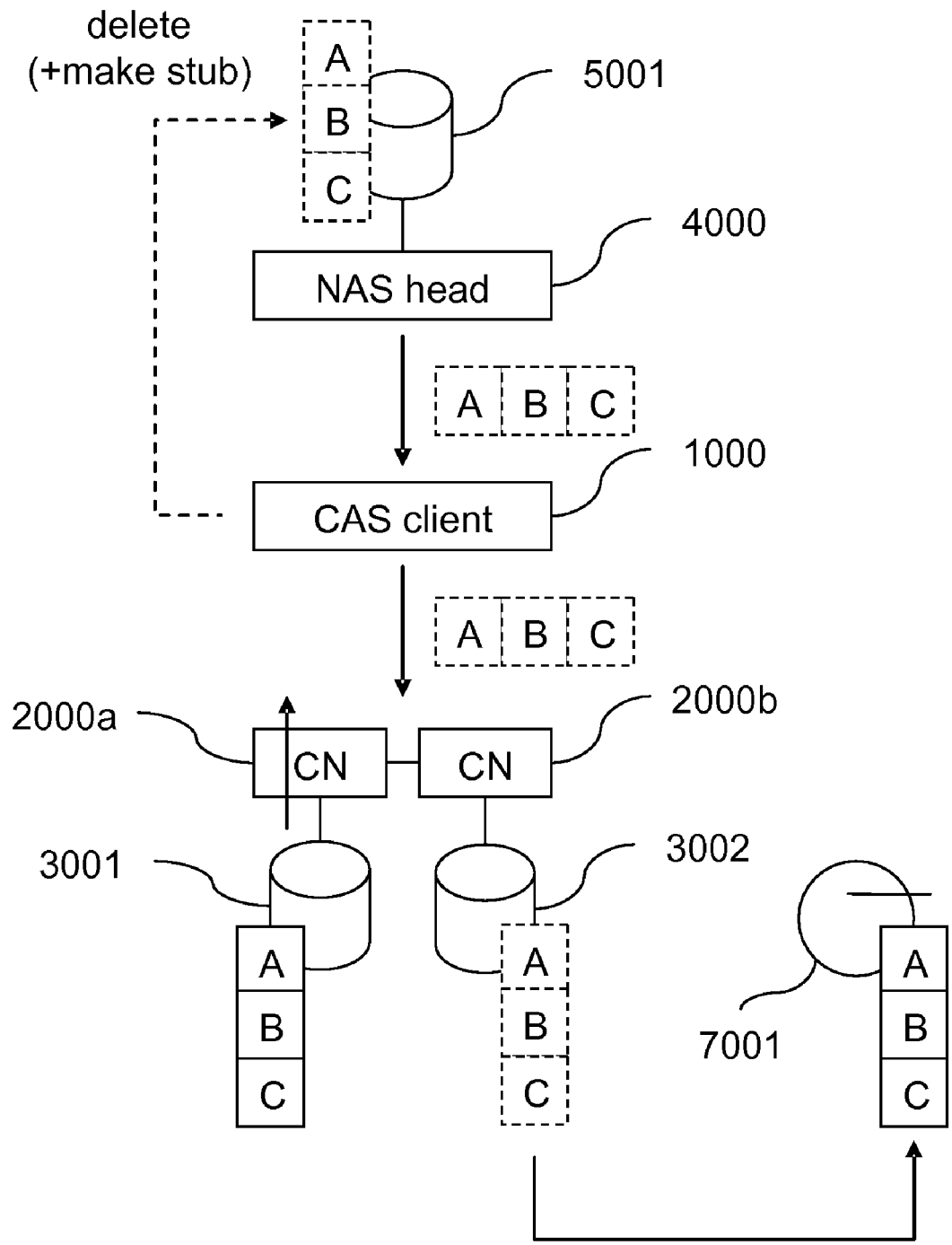

FIGS. 3, 4 and 5 illustrate a process of archived data protection between CAS system, storage system (NAS) and offline (backup) storage system, according to an embodiment of the invention. At first, data A, B, C is stored in storage system (NAS head 4000, FIG. 4). When data A, B, C is fixed, it is copied to CAS system CN 2000*a* by CAS client or server for archiving. When CAS client or server writes the data to CN 2000*a*, CN2000*a* makes replica of the data and writes to CN2000*b* for data duplication, i.e., backup. In the current embodiment, unlike the prior art, CAS client 1000 does not delete data A, B, C immediately after copying data A, B, C to CN 2000*a*. Instead, as will be detailed below, the data A, B C is retained until duplication is completed.

FIG. 3 illustrates the process according to an embodiment of this invention. At first, CAS client 1000 (executed by CAS program 1004, for example) checks NAS head 4000 to determine whether there is any data that should be archived (Step 1004*a*). If yes, CAS client 1000 copies data A, B, C from NAS head 4000 to CN 2000*a* and 2000*b*, 2000*b* being replica of data A, B, C (Step 1004*b*). Note that replicating occurs independently of archiving, and is performed by internal management of CAS system. Also, when the CAS system performs archiving of files A, B and C, the CAS client 1000 sets write protect flag on data A, B, C on NAS head 4000 to prevent write access from other NAS client (Step 1004*c*), hereinafter called write protection. To implement this, for example, CAS client 1000 turns access permission of data A, B, C to read only. Another implementation is that, for example, CAS client 1000 makes a temporary copy of data A, B, C into a different storage area of NAS head 4000 (shown as FIG. 4).

After this process, CAS client 1000 waits for the end of the migration process or replica of data A, B, C to offline storage system (Step 1004*d*). In this case, replica of data A, B, C in CN2000*b* is migrated to a device 7001 in offline storage system—see FIG. 5 (the detail of this migration process is described later). Then, CAS client 1000 disables write protection of data A, B, C and deletes these files (Step 1004*e*, 1004*f*). If necessary, it makes stub files for data A, B, C (Step. 1004*g*), providing the files address on device 3001, i.e., location on the hard drive storage or logical unit.

Figure 6A:
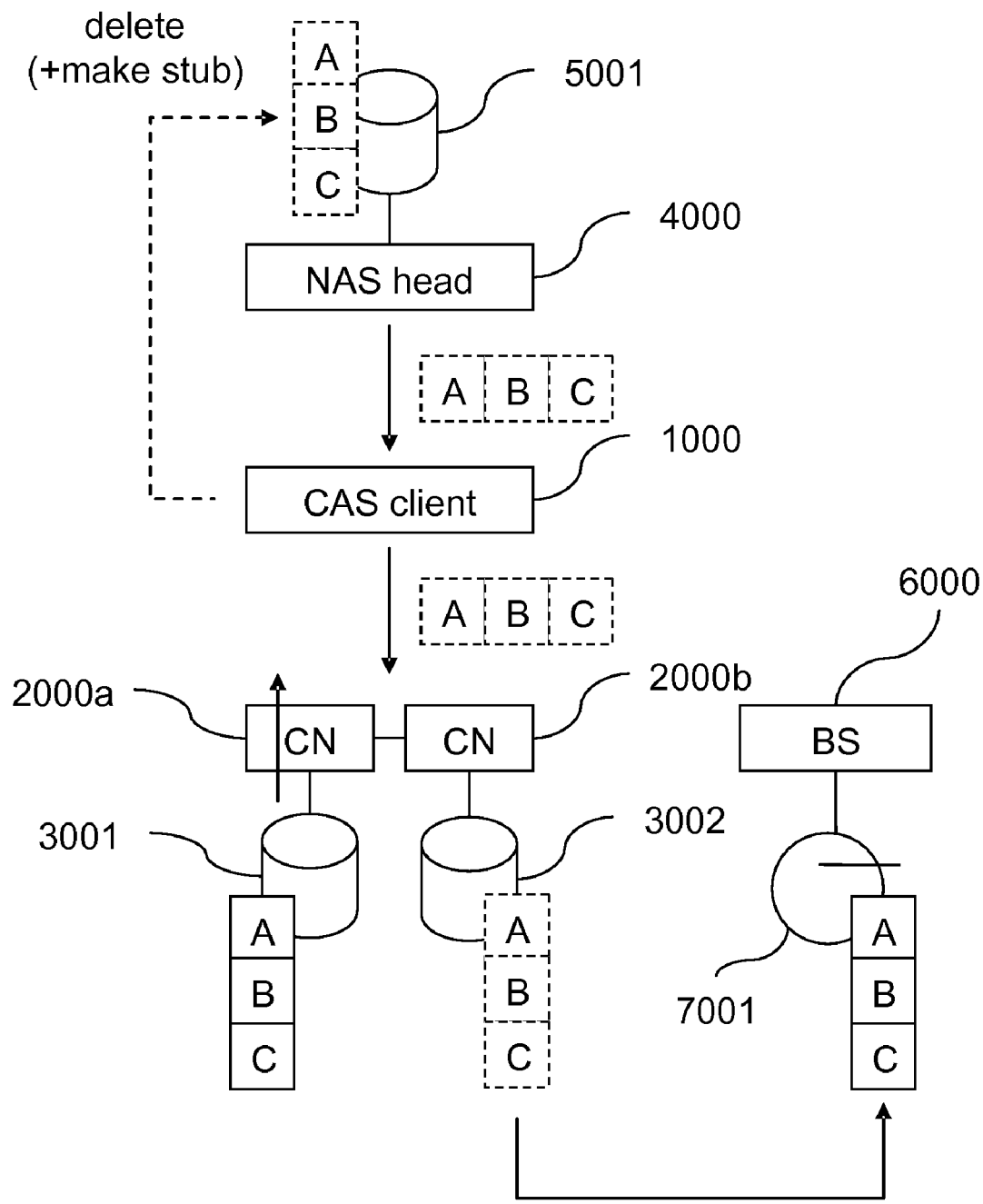
FIGS. 6a-6c illustrate similar arrangements to that of FIGS. 4 and 5, except that an independent backup system is used to duplicate the archived files.
Figure 6B:
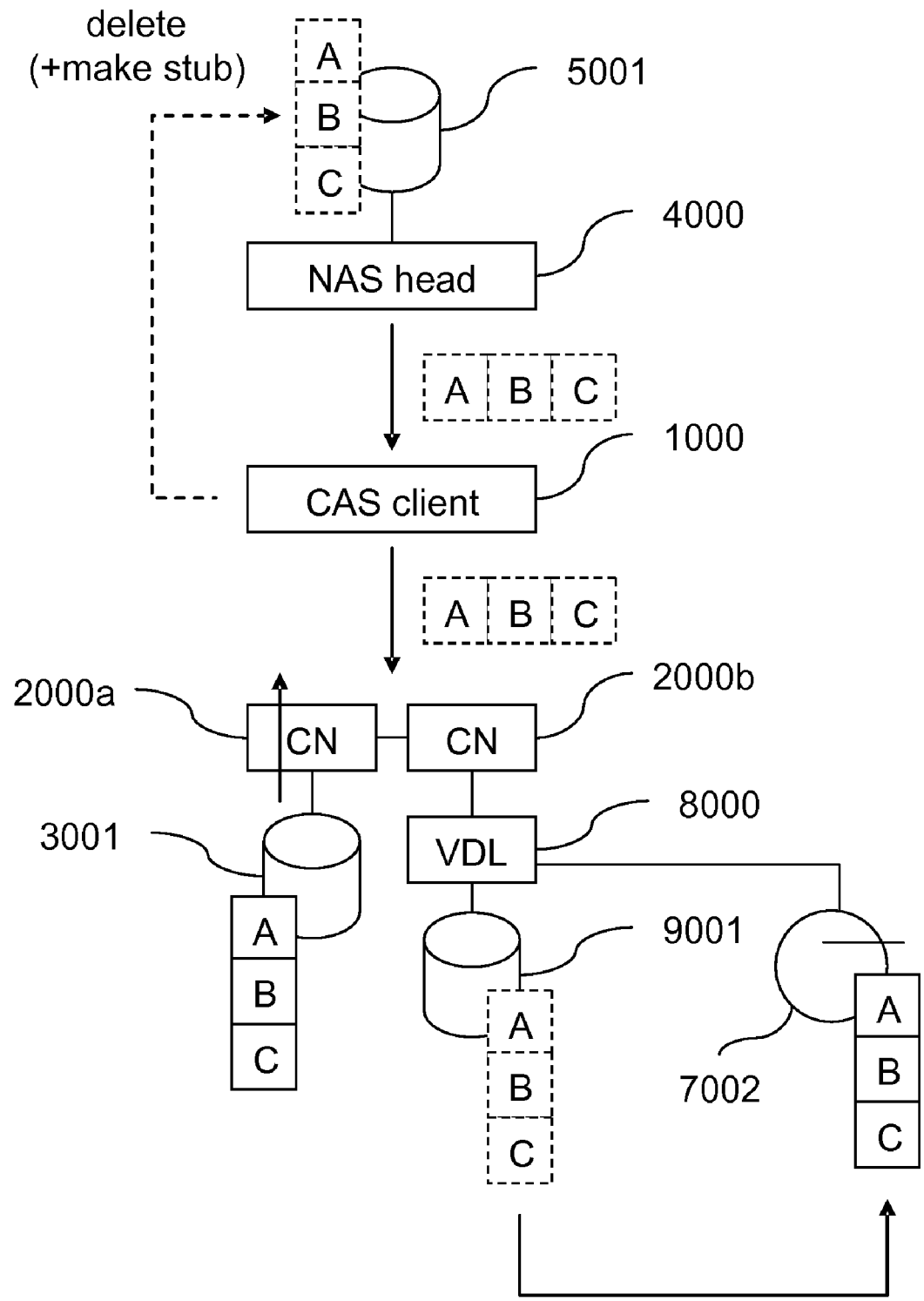
Figure 6C:
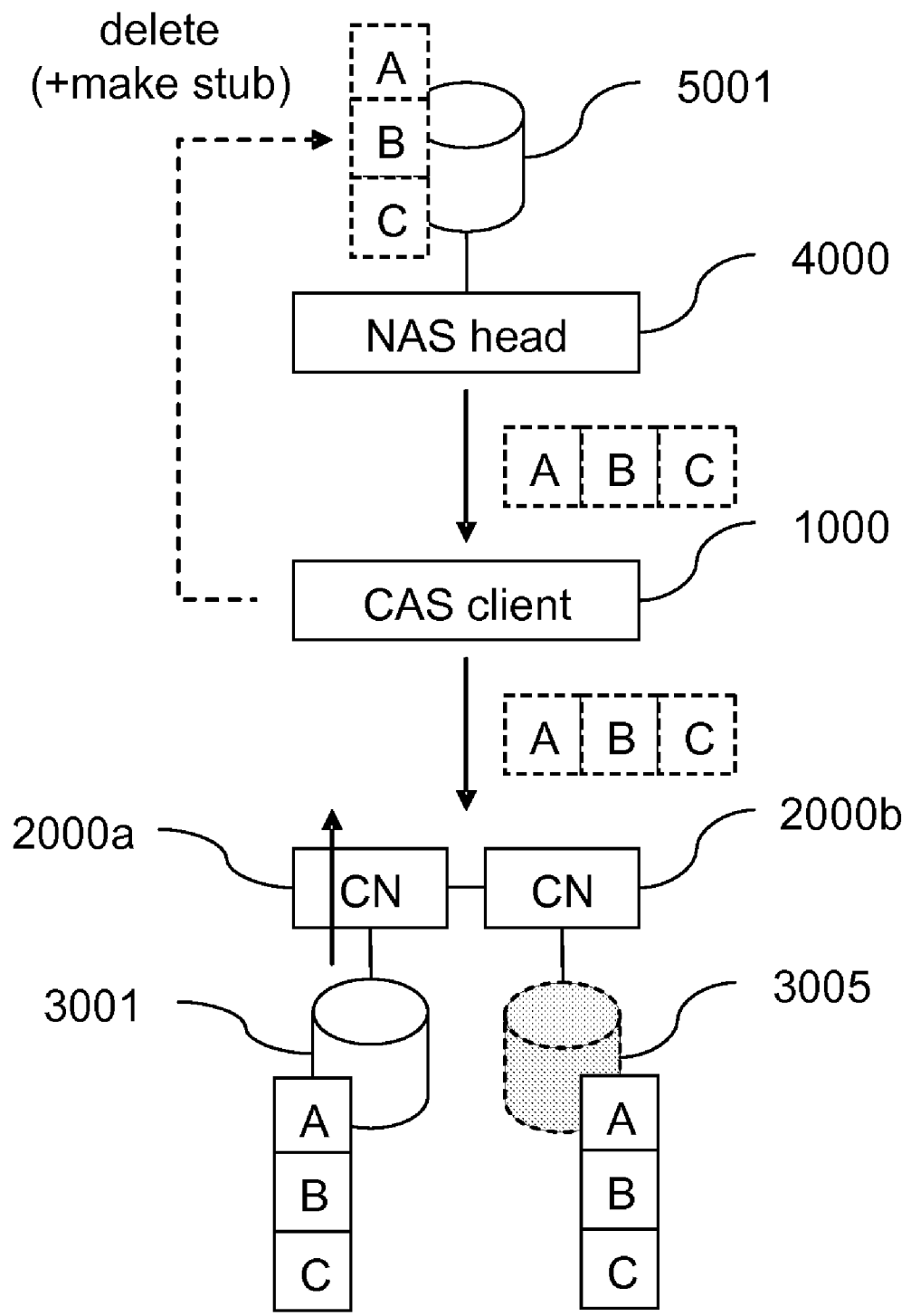

FIG. 6 illustrates a similar arrangement to that of FIGS. 4 and 5, except that an independent backup system BS 6000, a VDL(Virtual Disk Library) 8000, a power saving disk system 3005 such as MAID(Massive Arrays of Inactive Disks), etc., is used to duplicate the archived files. The operation would be similar to that of FIG. 3, except that the files A, B, C will not be deleted from the NAS system until the backup system completed duplication of the archived files. Once the backup system completes the duplication, the CAS system removes the write protect and enables deletion of the files.

Figure 7:
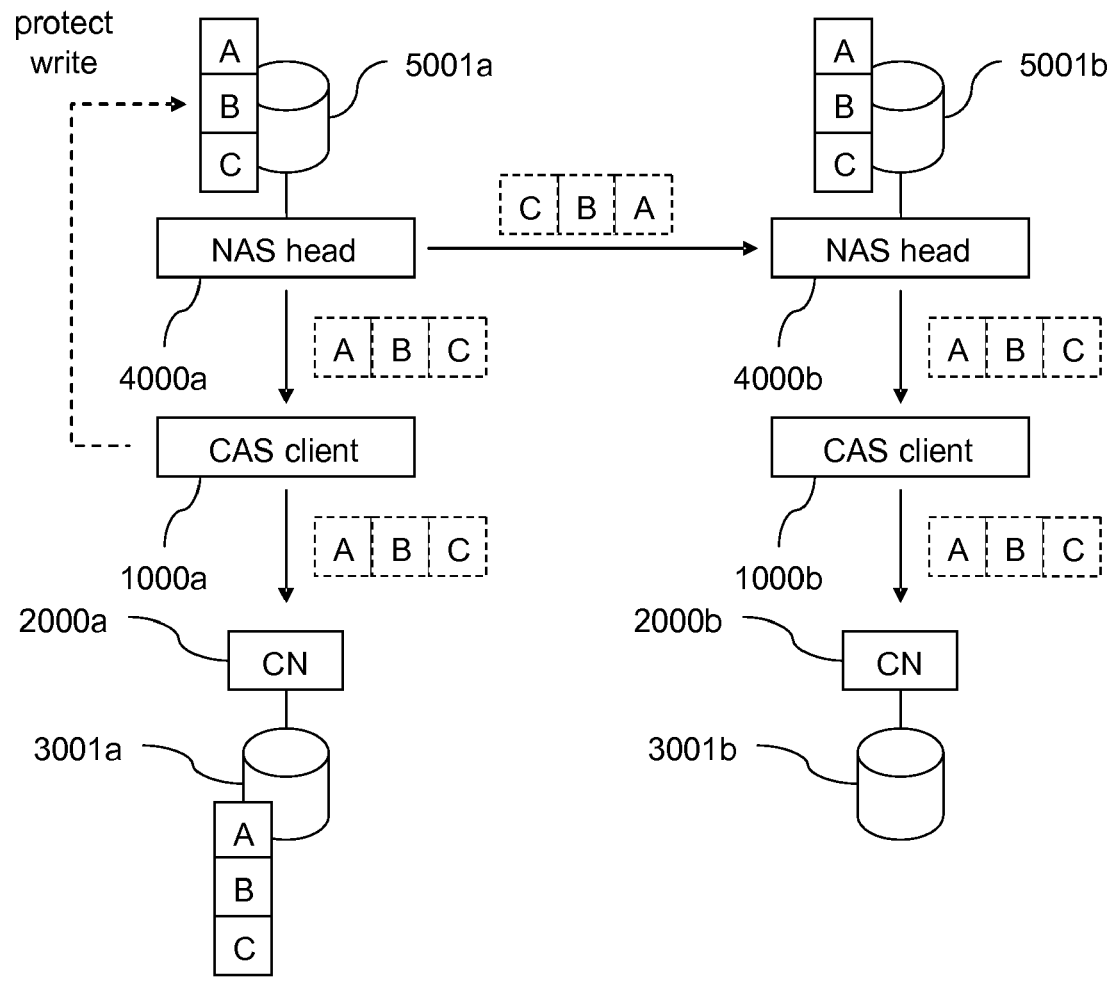
FIGS. 7 and 8 illustrate a process of archive data protection between CAS system, storage system (NAS) and offline (backup) storage system, in distributed remote sites, according to an embodiment of the invention.
Figure 8:
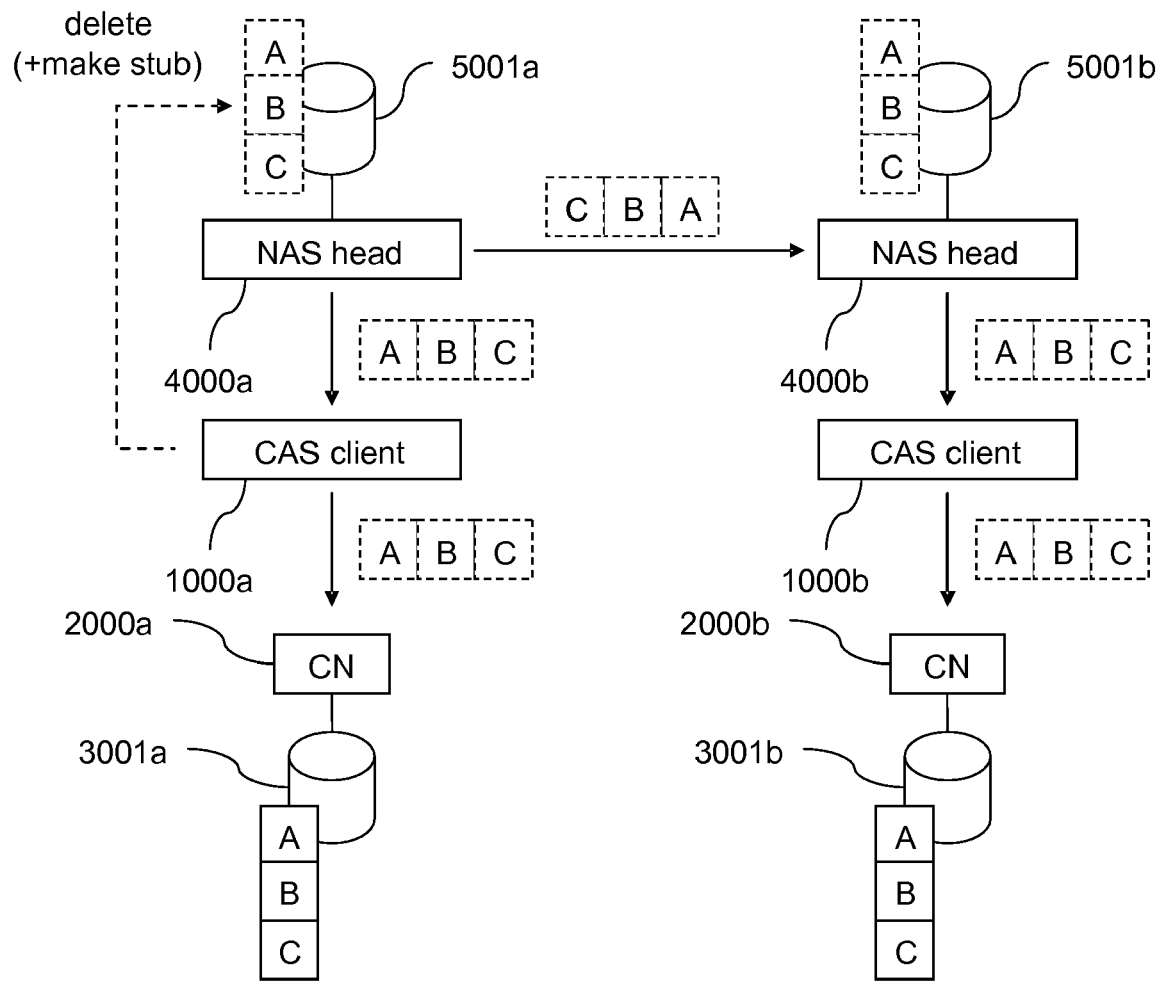

FIGS. 7 and 8 illustrate a process of archive data protection between CAS system, storage system (NAS) and offline storage system, in distributed remote sites, according to an embodiment of the invention. For disaster recovery, NAS head 4000*a* (located in site-A) sends its data A, B, C to NAS head 4000*b* (located in remote site-B), so that the data is synchronized between the two NAS heads. This means that if data of NAS head 4000*a* is modified, this modification will be sent to NAS head 4000*b* immediately.

In the prior art archiving process, CAS client 1000*a* deletes data A, B, C of NAS head 4000*a* immediately after copying data A, B, C to CN 2000*a*, and if necessary it makes stub file to indicate where data A, B, C is on the CAS system. As mentioned before, NAS head 4000a and 4000b synchronize their data, so if data A, B, C of NAS head 4000a is deleted, data A, B, C of NAS head 4000b will also be deleted. In this case, if site-A goes down because of a disaster or malfunction, data A, B, C will be lost if it has not been stored onto CAS 3001b. To prevent data lose, CN2000a sends data A, B, C to CN2000b. However, this solution requires more network bandwidth for data A, B, C to be transmitted from CAS 3001a to CAS 3001b.

However, as appreciated by the inventor, the data A, B, C has already been transmitted once to site-B by NAS head 4000a during the synchronization operation. Therefore, according to embodiments of the invention, use is made of this fact to reduce bandwidth requirement for the second transmission. Additionally, avoiding the transmission between the two CAS systems provides enhanced security, since every time data is transmitted it is exposed to a security attack.

In this embodiment of the invention, CAS client 1000a performs the process shown as FIG. 3. CAS client 1000a waits for the end of archiving process of CAS client 1000b in Step 1004d. Therefore, CAS client 1000b can get data A, B, C from NAS head 4000b and archive the files to CN 2000b without re-transmit of the data. This solution can keep data A, B, C to be stored in distributed remote sites anytime, without extra network bandwidth. That is, when CAS archiving is performed in Site A, the NAS files are not deleted, but rather are write-protected. Then Site B performs the CAS archiving according to its own schedule and using its own copy of the files from the NAS system of Site B (which is synchronized with the NAS files in Site A). Once archiving is completed by Site B, the files are deleted from the NAS system in Site A. Since thereafter the NAS systems in Site A and Site B are synchronized, the files are automatically deleted from the NAS system in Site B. As can be understood, using this embodiment no transmission of files is performed between the CAS system in Site A and the CAS system in Site B.

Another feature of the invention is the reduction of cost for the CAS archiving and backup storage. Notably, in the current state of the art, the CAS archiving and CAS duplication or backup is performed using hard drives, which are rather costly. However, the inventor has noted that the system can operate with similar efficiency using cheaper tape drives if certain inventive features are implemented, as described herein. By implementing embodiments of the invention, one is able to retain the feature-reach environment of CAS, while using lower cost tape drives for storage.

In its overall aspect, the system utilizes standard HDD for the CAS archiving system, but utilizes tape drive for the duplication or backup of the archived files. A mapping is maintained to enable finding any backup file on the tape, corresponding to any archived file on the HDD. If a user calls an archived file, the file is fetched from the CAS HDD storage. Similarly, when a stub is stored in the NAS system, it contains the address of the archived file in the HDD storage system, not of the tape location. However, if the CAS HDD system fails, it may be restored using the mapping information to retrieve the files from the tape system.

Figure 9:
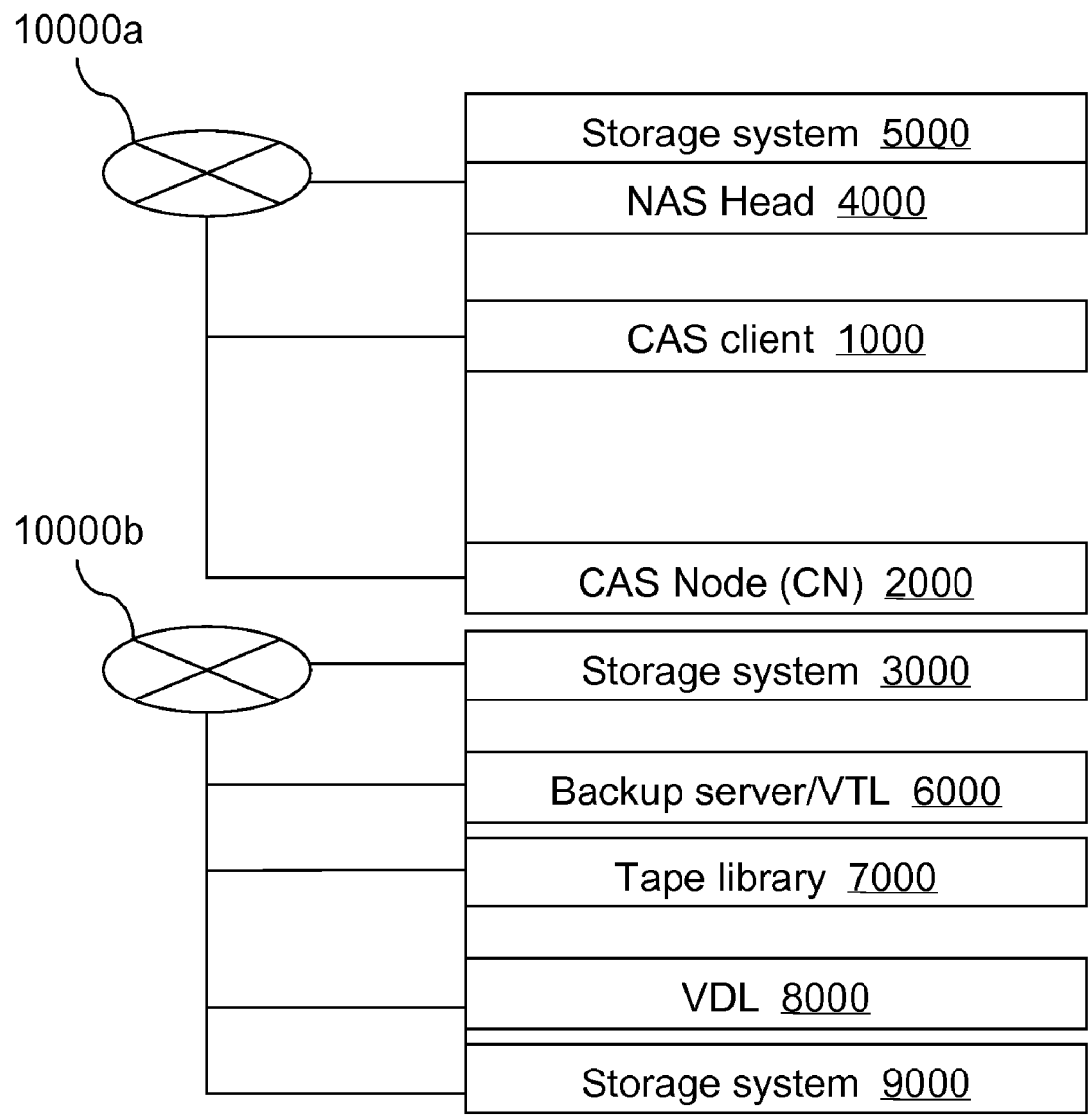
FIG. 9 illustrate a system structure according to an embodiment of the invention, utilizing tape backup system.

FIG. 9 illustrate a system structure according to an embodiment of the invention, utilizing tape backup system. The system according to this embodiment consists of the following components: a CAS client 1000, which may be used to search or interrogate files in the CAS system, CAS Node, i.e., CAS head (CN) 2000, CAS storage system, e.g., HDD, RAID array, etc., 3000, NAS head 4000, NAS storage system, e.g., HDD, RAID array, etc., 5000, backup server/VTL (virtual tape library) 6000 and backup tape library 7000. Also shown are: VDL (virtual disk library) 8000 and duplication storage system 9000. The above listed elements are coupled via networks—LAN 1000a and network—SAN 1000b.

Figure 10:
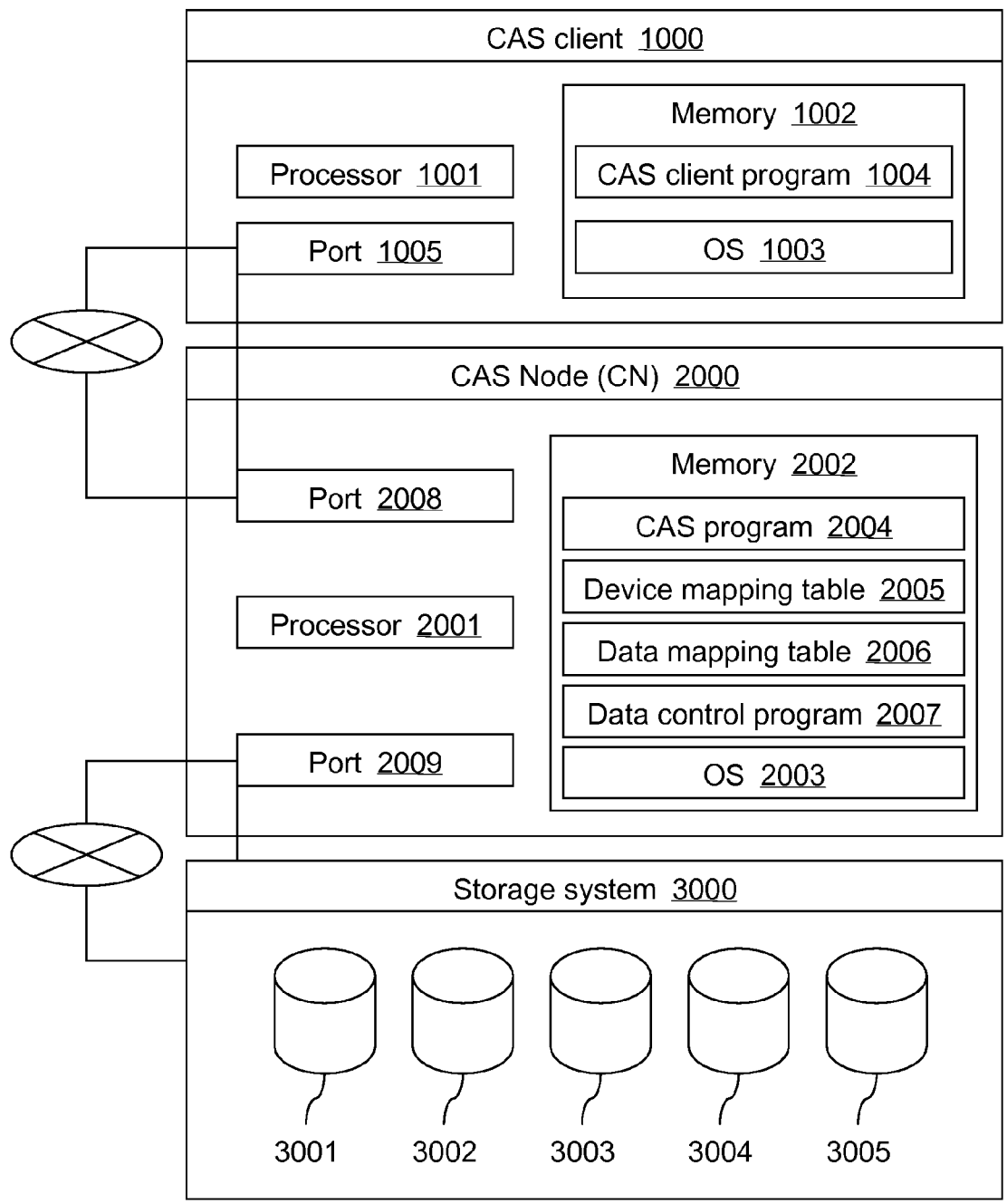
FIG. 10 illustrates an example of CAS system according to embodiment of the invention.

FIG. 10 illustrates an example of CAS system according to embodiment of the invention. It consists of CAS client 1000, CAS node CN 2000 and storage system 3000. CAS client 1000 has the function of archiving data from the storage system (i.e., NAS head 4000) to CAS Node. CAS client 1000 consists of the following components: Processor 1001, Memory 1002, OS (Operating System) 1003, CAS client program (executes data archiving functionality) 1004, and Port (connected to LAN 10000a) 1005.

CAS Node (CN) 2000 has the function of handling read/write archive data from CAS client, using content address mechanism. Generally, CAS system has plurality of CAS Nodes and stores archived data and backup data duplication. CN 2000 consists of the following components: Processor 2001, Memory 2002, OS (Operating System) 2003, CAS program (which execute read/write/manage archive data) 2004, Device mapping table (described later) 2005, Data mapping table (described later) 2006, Device control program (described later) 2007, Port (connected LAN 10000a) 2008, and Port (connected SAN 10000b) 2009.

Storage system 3000 is generally a disk array system, which has the function of storing archived data written by CN 2000. Storage system 3000 has array controller handling RAID mechanism, providing LU (Logical Unit) to CN 2000 via SAN. In this embodiment elements 3001-3005 are LU (Logical Units).

Figure 11:
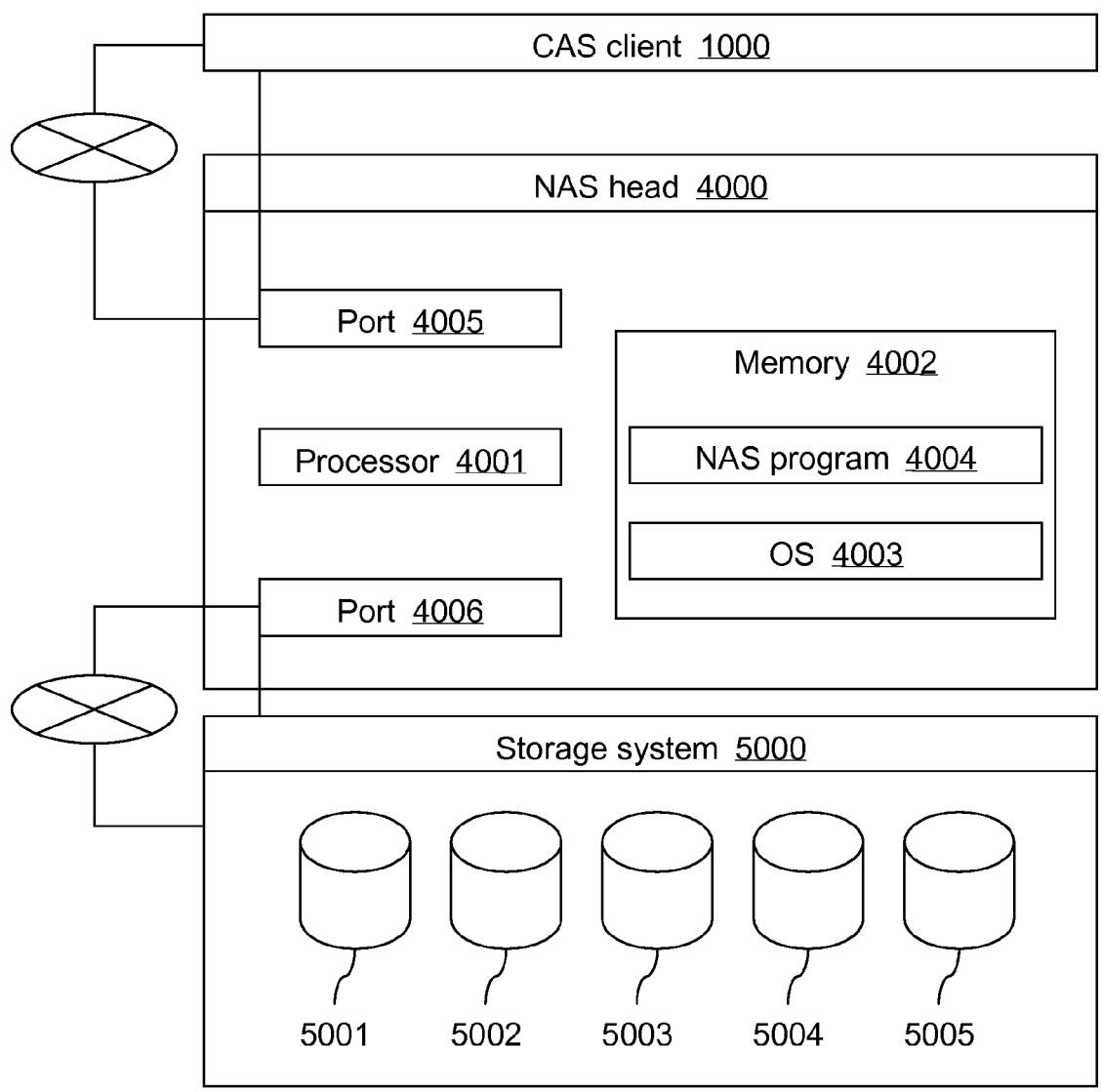
FIG. 11 illustrates an example of storage system according to an embodiment of the invention.

FIG. 11 illustrates an example of storage system according to an embodiment of the invention. It consists of NAS head 4000 and Storage system 5000. NAS head 4000 has NFS/CIFS server functionality and stores data to Storage system 5000.

Figure 12A:
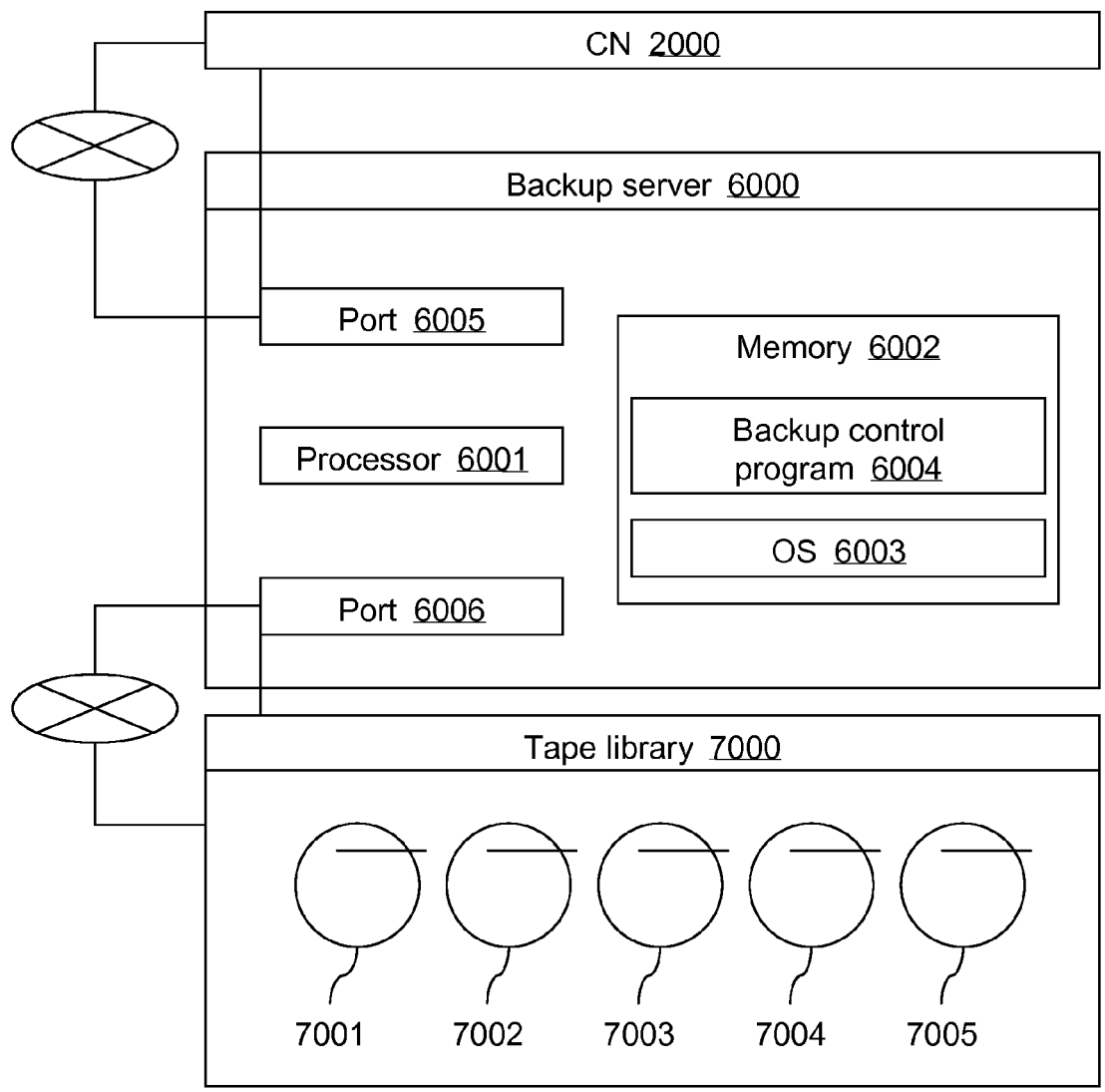
FIG. 12(a) illustrates an example of offline storage system according to an embodiment of the invention.
Figure 12B:
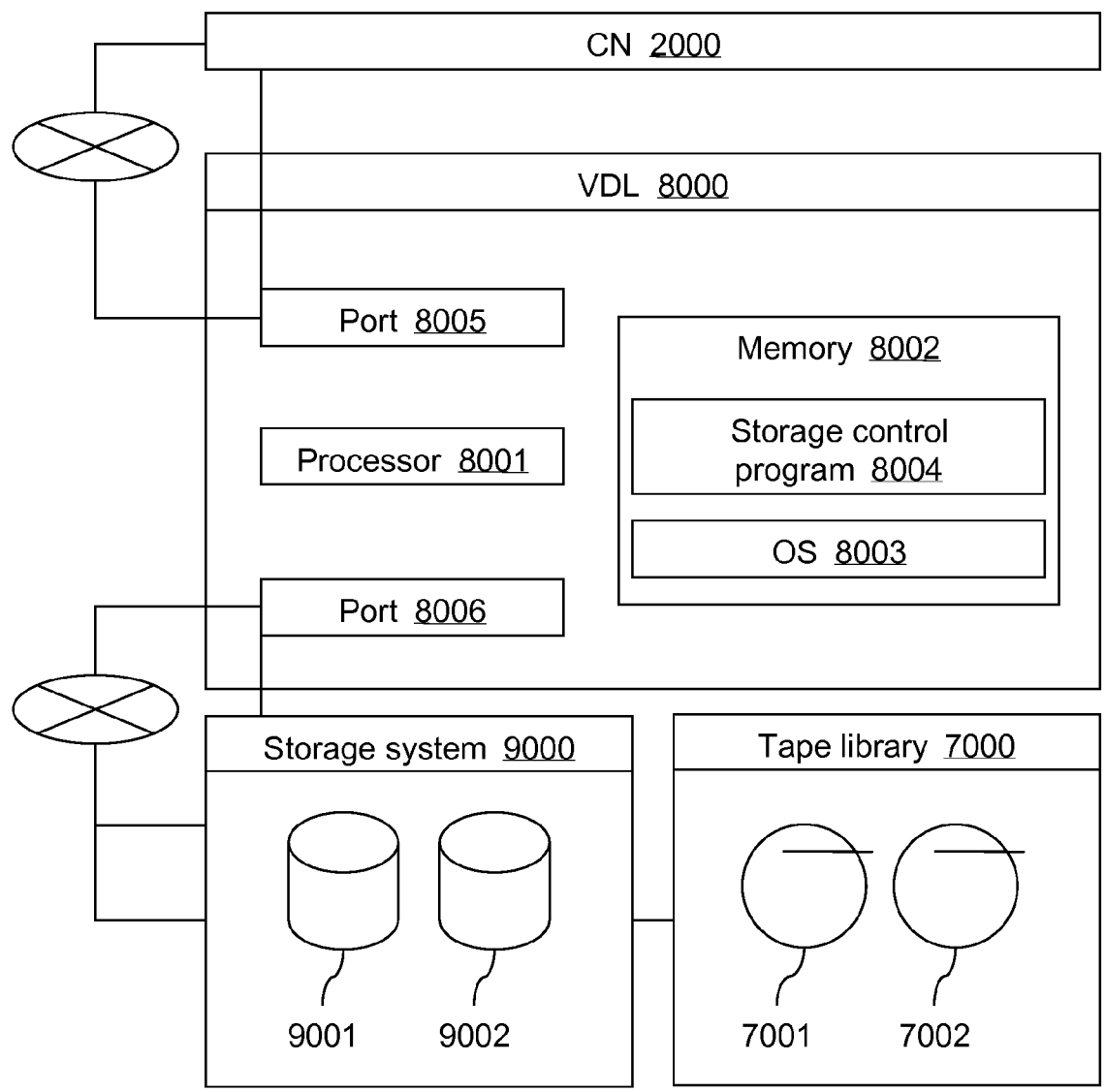
FIG. 12(b) illustrates an example of offline storage system using VDL, storage system, and Tape library according to an embodiment of the invention.

FIG. 12(a) illustrates an example of offline storage system according to an embodiment of the invention. The storage system of FIG. 12a uses Backup server 6000 and Tape library 7000 (which has several tape devices 7001-7005). It provides offline tape, VTL (Virtual Tape Library) functionality. FIG. 12(b) illustrates an example of offline storage system using VDL (Virtual Disk Library) 8000, Storage system 9000 and Tape library 7000 (which has several tape devices 7001-7005) according to an embodiment of the invention. VDL 8000 is connected to CN 2000 and provides LU 9001 and 9002. VDL 8000 moves data from Storage system 9000 to Tape library 7000 if necessary.

As mentioned before, archived data is stored into both CAS system and offline storage system, i.e., duplication or backup system. Notably, the CAS system stores both an archived file and a replica of the file onto the CAS system. However in the prior art, hard disks are used for both CAS and backup storage systems. Moreover, copying into the backup system of either the archived file or its replica file is done based on disk usage of the storage system. In this case, it is difficult to determine which device(s) can be migrated to offline storage system.

According to observations of the inventor, at least the original data should be stored into CAS system (disk array system) because CAS client 1000 often needs to read the archive data immediately. If both the original data and the replica data are stored in an offline storage system, it would take a lot of time to access the required data. Also, if both original data and replica data are stored into CAS system, the cost of data retention becomes expensive as CAS systems use hard drives.

To solve this problem, an embodiment of this invention provides a method for managing write operations of archived data depending on device type or characteristics information in the CAS system. In this embodiment, CN 2000 predefines LU type and stores original and replica of archived data depending on this LU type definition. Original data is stored onto LU type "Online/P", i.e., primary logical unit, while replica data is stored onto LU type "Online/S", i.e., secondary logical unit. If the disk usage of Online/S is over a preset threshold, replica data in this LU is migrated into an offline storage system. However, in order to assure rapid access time to archived files, the archived files are retained in the Online/P and are not migrated into the offline storage system.

Figure 13:
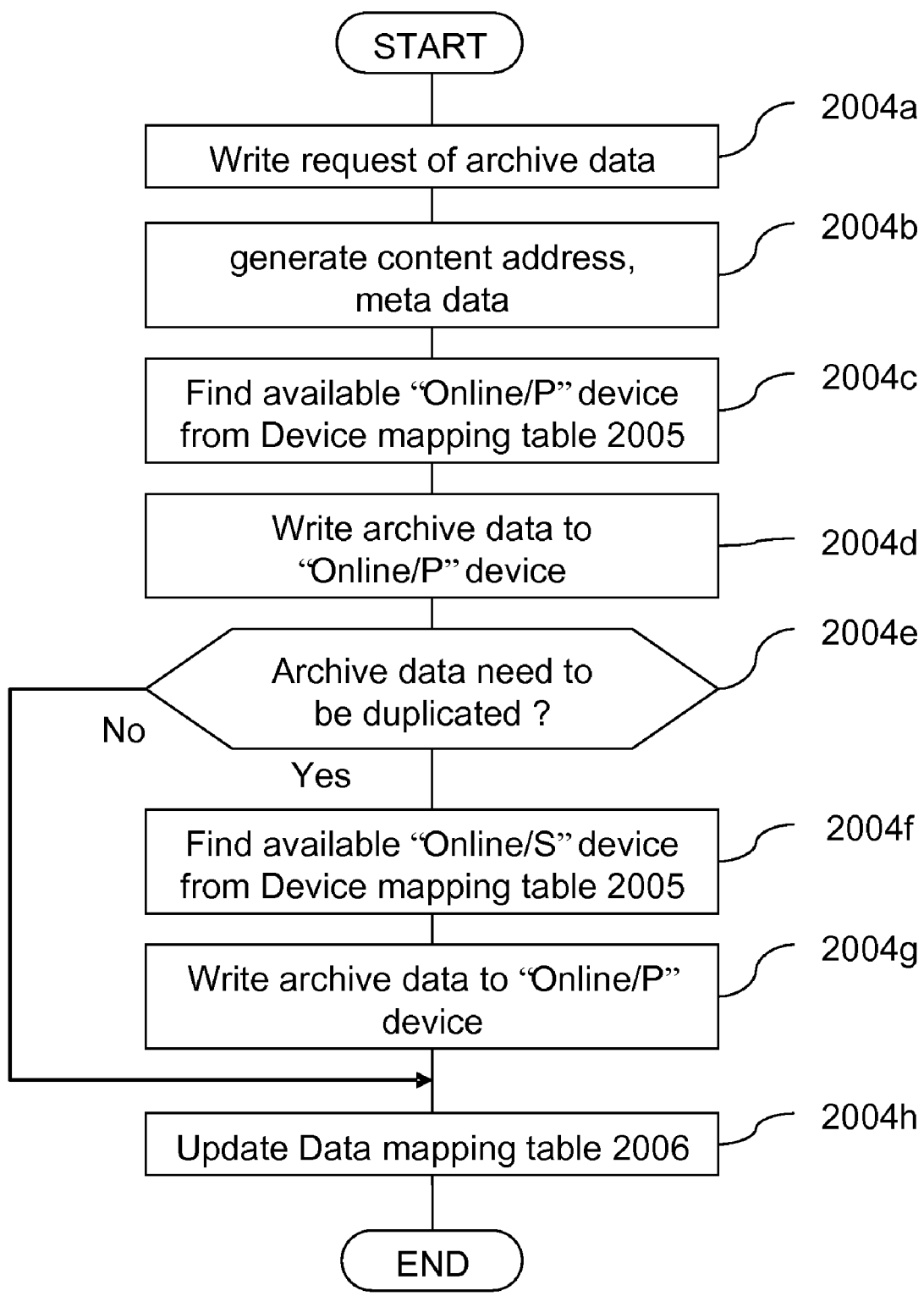
FIG. 13 illustrates a process according to an embodiment of the invention for transferring replica files onto an offline storage system.

FIG. 13 illustrates a process according to an embodiment of the invention for transferring replica files onto offline storage. This process is executed by CAS program 2004 on CN 2000, for example. When CN2000 receives write requests of archive data (Step 2004a), CN 2000 generates content address and Meta data (Step 2004b). Next, CN 2000 finds available "Online/P" devices from Device mapping table 2005 (Step 2004c). "Online/P" is storage device that is defined for storage of original data only. Usually disk array system is preferred so that CAS client 1000 can access archive data immediately.

Figure 14A:
FIGS. 14(*a*)-14(*d*) illustrate Device mapping table 2005 according to an embodiment of the invention.

FIG. 14(a) illustrates Device mapping table 2005 according to an embodiment of the invention. The Device mapping table has the following information: Device—device name (for example, LU 3001, LU 3002 . . . ); Used/Size—disk utilization of the device; Attribute—indicates device type; "Online/P"—device to store the original data; "Online/S"—device to store the replica data; "Offline"—offline device which stores the replica data migrated from "Online/S" device; Condition—current device condition ; and "Available" or "Unavailable."

Device mapping table 2005 is defined by IT manager or other user. In FIG. 14(a), LU 3001, 3003, 3004 are "Online/P" devices. In this case CN 2000 stores data A, B, C to LU 3001 considering disk utilization (Step 2004d), shown as FIG. 6(a). Then, CN 2000 checks whether archived data A, B, C needs to be duplicated or not (2004e). If yes, CN 2000 finds available "Online/S" devices from Device mapping table 2005. In this case, LU 3002, 3005, 9001, 9002 are selected, and write replica of data A, B, C to one of these devices (here, CN 2000 writes replica to LU 3002 shown as FIG. 6(a). Finally, CN 2000 updates Data mapping table 2006 that shows where each archive data is stored (Step 2004h). As shown in FIG. 15(a), data A, B, C (/fs1/A, /fs1/b, /fs1/c) is stored both device 3001 and 3002.

Figure 14B:
Figure 14C:
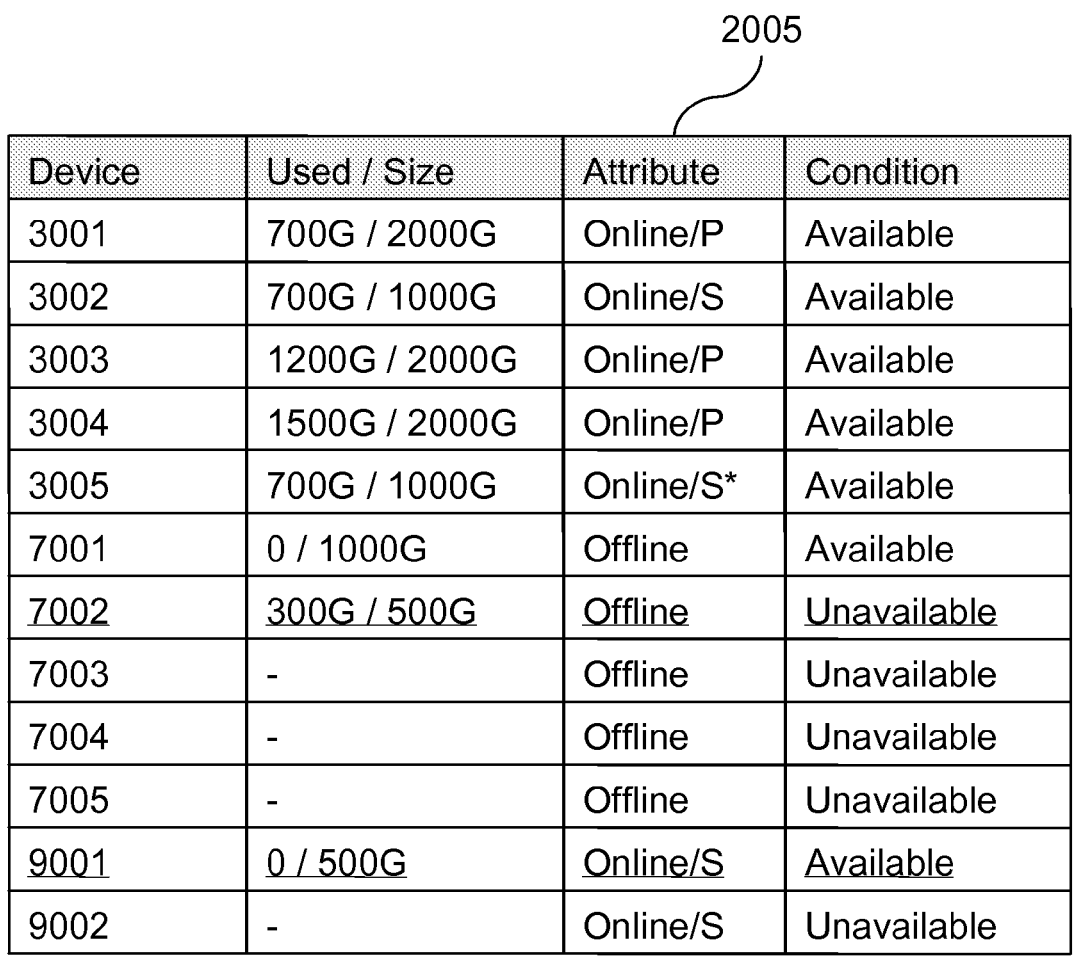
Figure 16:
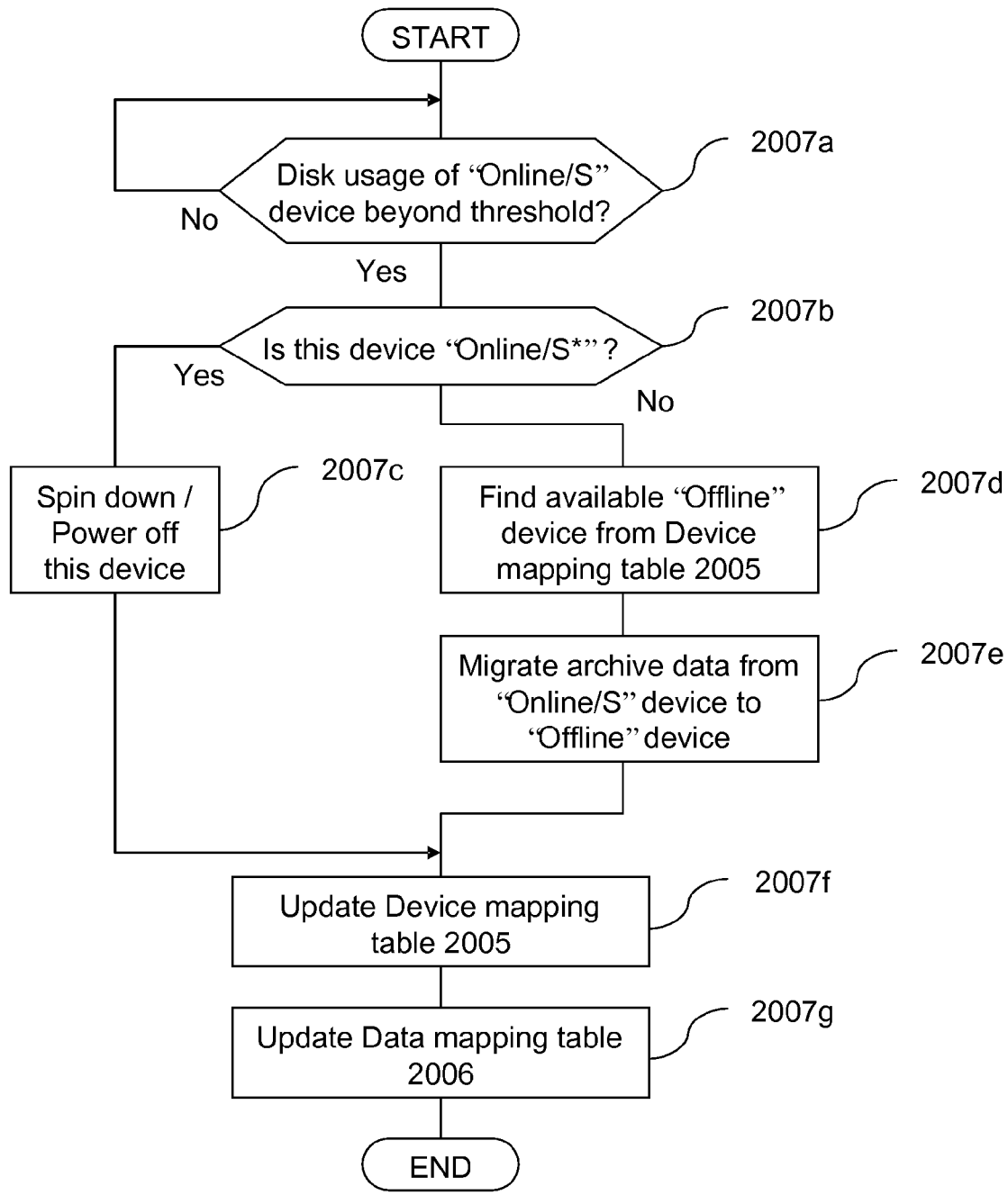
FIG. 16 shows a flow chart for migrating replica data to offline storage system according to an embodiment of the invention.

After this process, archived data stored into "Online/S" device should be migrated to offline storage system to reduce cost of data retention. FIG. 16 shows a flowchart for migrating replica data to offline storage system according to an embodiment of the invention. This process may be executed by Data control program 2007 on CN 2000, for example. At first, CN 2000 checks disk usage of "Online/S" devices. If the disk usage of each device is over a preset threshold (for example 70%), the data of these devices is migrated into offline storage system. If yes (in this case, LU 3002 is selected), CN 2000 checks whether these devices are "Online/S*" or not (Step 2007b). "Online/S*" means LU that can be turned to spin down or power down, so the data does not need to be migrated because "Online/S*" device can provide reduction of cost using these features by itself (it will be described later). If no, CN 2000 finds available "Offline" device to migrate data of LU 3002 (Step 2007d). For example, tape device 7001 is available. Then, data of LU 3002 is migrated to "Offline" tape device 7001 (Step 2007e). After that, CN 2000 updates Device mapping table 2005 (FIG. 14(b), Step 2007f) and Data mapping table 2006 (FIG. 15 (b), Step 2007g). The example of this structure is shown as FIG. 6(a). The example structure of using VDL is shown as FIG. 6(b), Device mapping table 2005 is FIG. 14(c).

Figure 14D:
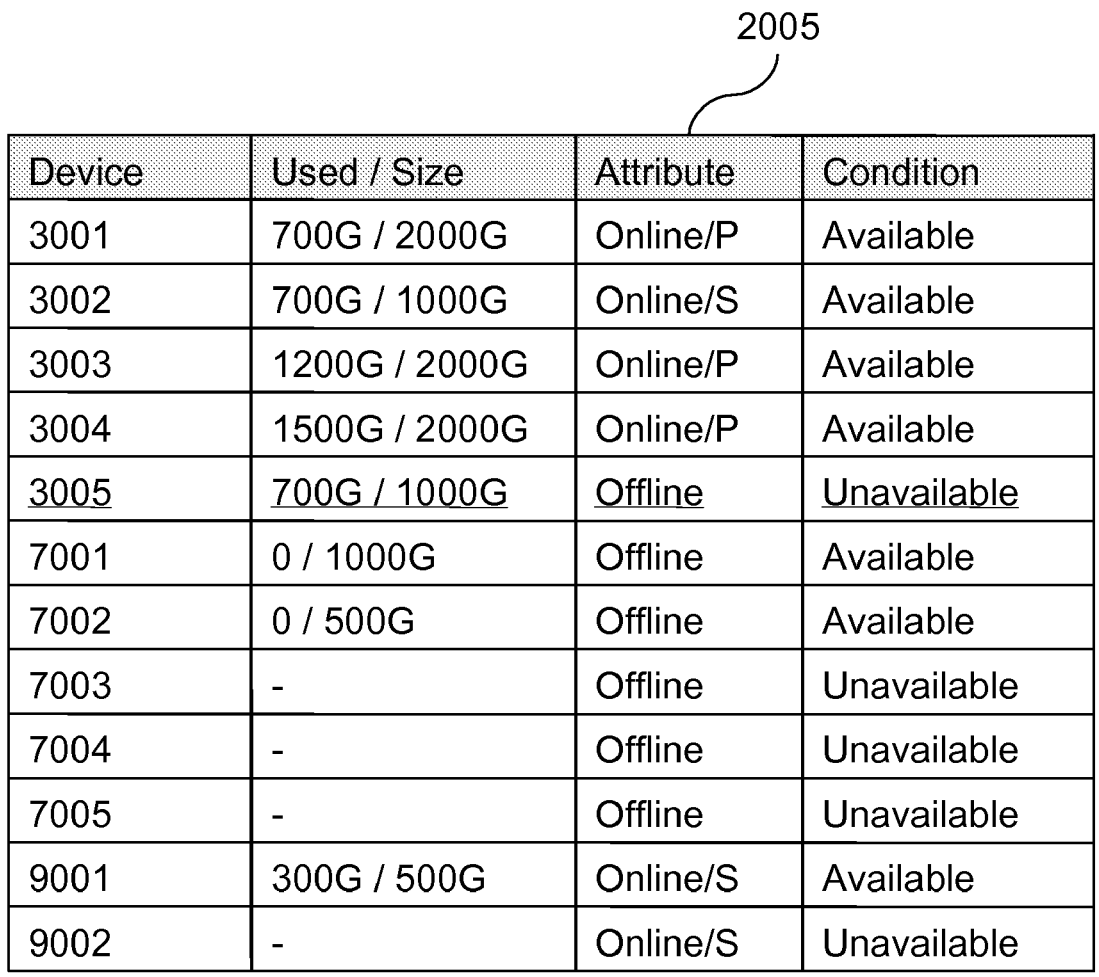

Returning to Step 2007b, if yes, CN 2000 turns these devices to spin down or power down (Step 2007c). In this case, LU 3005 is "Online/S*" device, and over the threshold, then turns this LU to spin down or power down (shown as FIG. 6(c)). After that, CN 2000 updates Device mapping table 2005 (FIG. 14(d), Step 2007f) and Data mapping table 2006 (Step 2007g).

Figure 17:
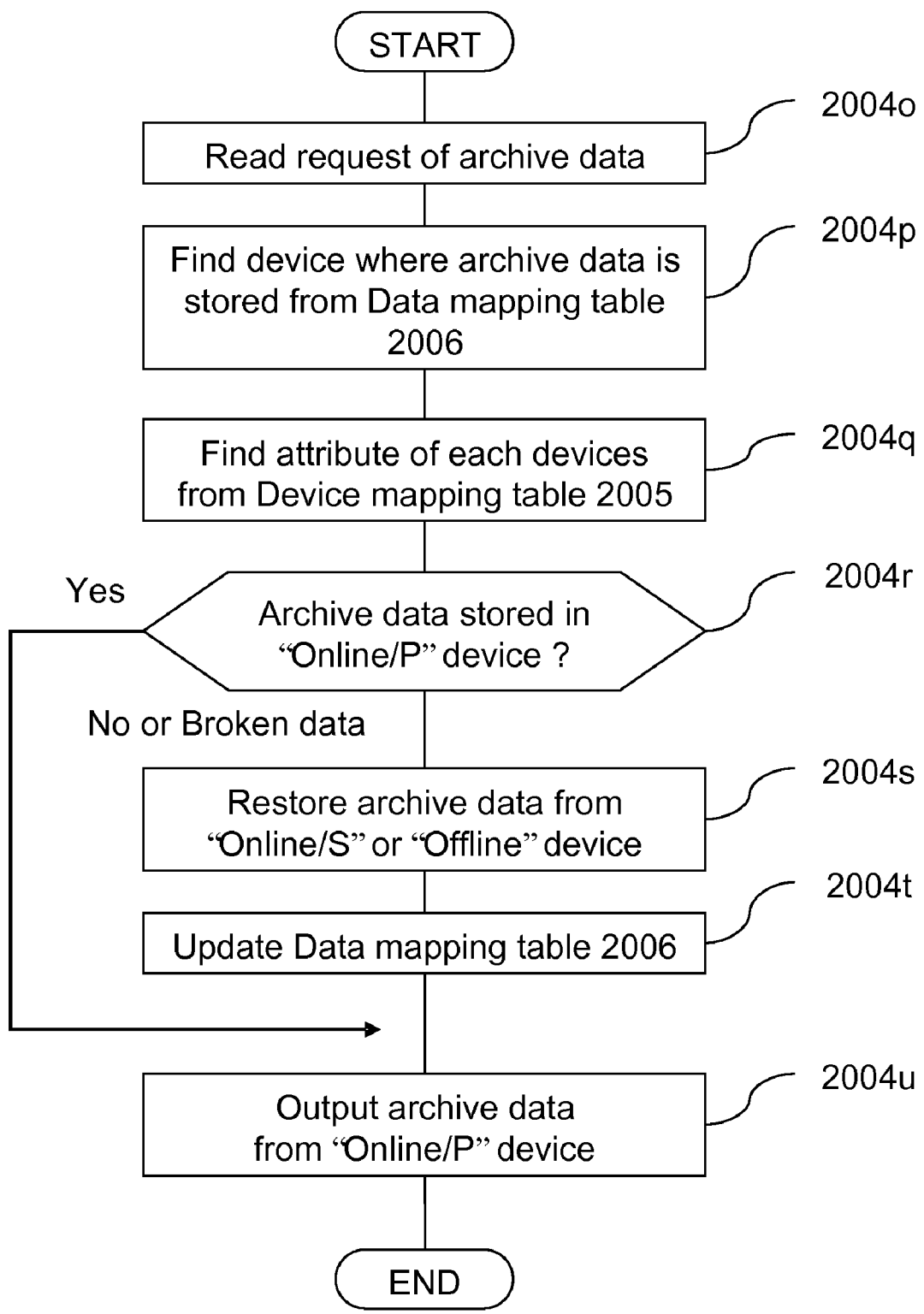
FIG. 17 illustrates a process for retrieving archived data according to an embodiment of the invention.

By the way, CAS client 1000 often needs to read archived data stored in the CAS system. In this case, data should be obtained from "Online/P" devices, not from "Offline" devices. FIG. 17 illustrates a process for retrieving archived data according to an embodiment of the invention. This functionality may be executed by CAS program 2004 on CN 2000, for example. When CN 2000 receives read request of the data (Step 2004o), CN 2000 finds the devices where the data is stored from Data mapping table 2006 (Step 2004p). For example, data A is stored both LU 3001 and tape device 7001 (shown as FIG. 15(b)). Next, CN2000 finds attribute of each device found by previous Step, from Device mapping table 2005 (Step 2004q). In this case, LU 3001 is "Online/P" and tape device 7001 is "Offline". Then, CN 2000 checks whether archive data is stored in "Online/P" device or not (Step 2004r). In Data mapping table 2006, data A is stored in LU 3001, "Online/P" device, so CN 2000 responds to the read request of data A, using LU 3001, "Online/P" device (Step 2004u). If no entry for data A is present for Online/P, or if data A is corrupted or unavailable, CN 2000 restores the data A from tape device 7001, "Offline" device (Step 2004s), onto a primary device and updates Data mapping table 2006 (Step 2004t).

Figure 18A:
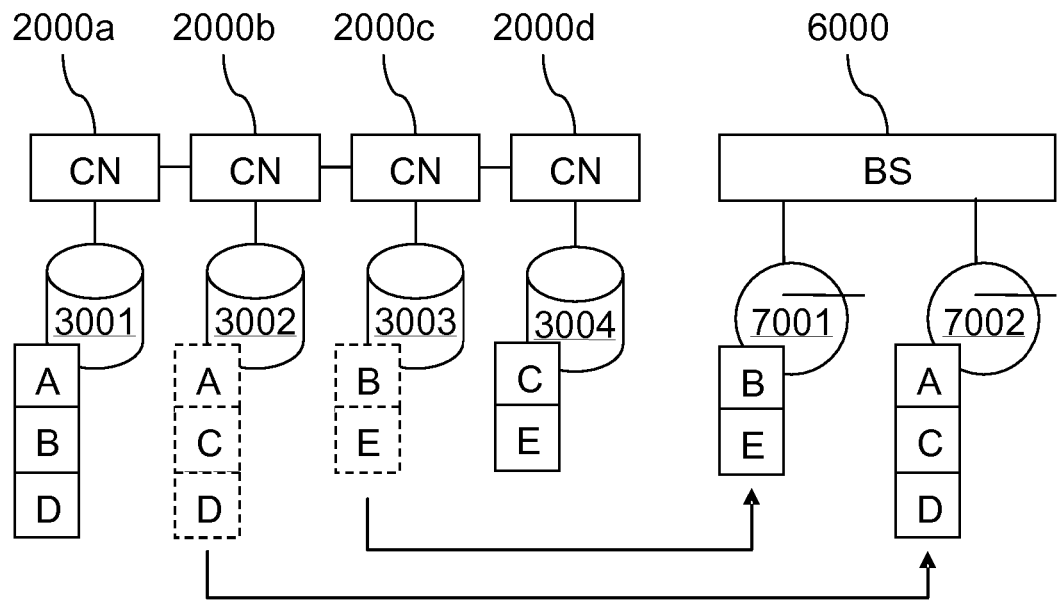
FIGS. 18(*a*) and 18(*b*) illustrate embodiments of the invention having multiple instances of CAS systems coupled to backup system.
Figure 18B:
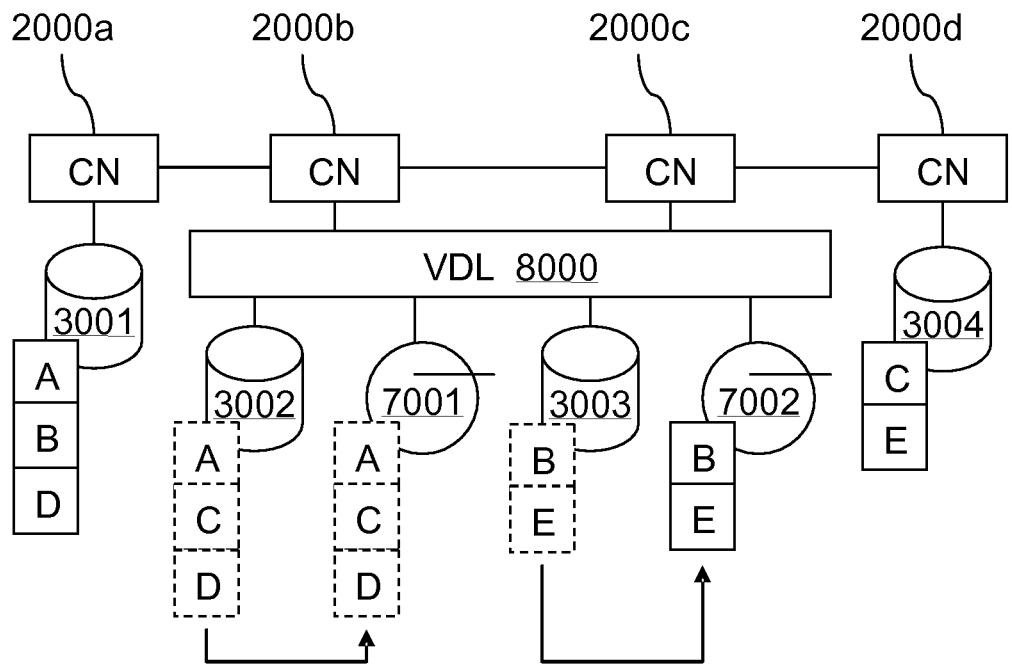

It should be appreciated that this embodiment is not limited by the number of CN, as shown in FIGS. 18(a) and (b). In this case, LU 3001 and 3004 are "Online/P" devices, LU 3002 and 3003 are "Online/S" devices, and then each archive data is stored in distributed CNs.

The replica data in "Online/S" device can be migrated to offline storage system 7001, 7002 to reduce cost of archive data retention.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described methods and systems may be implemented in a wide variety of programming or scripting languages, such as Assembler, C/C++, perl, shell, PHP, Java, etc.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the plasma chamber arts. It is intended that the specification and examples be considered as exemplary only, with a true scope and spirit of the invention being indicated by the following claims.

The invention claimed is:

1. A method of managing file storage in first and second sites, each site having a storage system and content addressable storage (CAS) system, comprising:
   synchronizing files in the storage system of the first site with storage system of the second site;
   when an archiving operation begins in the first site, performing the steps:
      enabling write protect on files on storage system in the first site;
      copying the files from the storage system in the first site onto the CAS system in the first site;
      monitoring archiving operation in the second site and, upon completion of archiving operation in the second site deleting the files from the storage system in the first site.

2. The method of claim 1, wherein archiving operation in the second site comprises copying files from the storage system of the second site to the CAS system of the second site.

3. The method of claim 1, wherein the storage system comprises a network attached storage (NAS) and further comprising storing a stub in the NAS system of the first site, indicating the storage location of the archived files in the CAS system of the first site.

4. The method of claim 1, further comprising upon receiving a read request from the storage system of the first site for one of the files, determining whether a corresponding archived file exists in the CAS storage of the first site and, if so, fetching the corresponding archived file from the CAS system of the first site; otherwise, fetching a corresponding backup file from the CAS system of the second site and storing a copy in the CAS system of the first site to thereby generate a restored archived file, and thereafter providing the restored archived file to the storage system of the first site.

* * * * *